(12) United States Patent
Jung et al.

(10) Patent No.: US 12,381,240 B2
(45) Date of Patent: Aug. 5, 2025

(54) FUEL CELL GENERATION SYSTEM CONTROL APPARATUS, SYSTEM INCLUDING THE SAME AND METHOD THEREOF

(71) Applicants: Hyundai Motor Company, Seoul (KR); Kia Corporation, Seoul (KR)

(72) Inventors: Ju Hae Jung, Uiwang-si (KR); Yong Min Kim, Seoul (KR); Hyun Bae Dong, Seoul (KR); Sun Hee Jo, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 17/973,168

(22) Filed: Oct. 25, 2022

(65) Prior Publication Data

US 2023/0307675 A1   Sep. 28, 2023

(30) Foreign Application Priority Data

Mar. 24, 2022  (KR) .................. 10-2022-0036902

(51) Int. Cl.
| | |
|---|---|
| *H01M 8/04* | (2016.01) |
| *H01M 8/04225* | (2016.01) |
| *H01M 8/04302* | (2016.01) |
| *H01M 8/04537* | (2016.01) |
| *H01M 8/04858* | (2016.01) |
| *H01M 8/04955* | (2016.01) |

(52) U.S. Cl.
CPC ..... *H01M 8/0494* (2013.01); *H01M 8/04225* (2016.02); *H01M 8/04302* (2016.02); *H01M 8/04619* (2013.01); *H01M 8/04955* (2013.01)

(58) Field of Classification Search
CPC .......... H01M 8/0494; H01M 8/04225; H01M 8/04302; H01M 8/04619
See application file for complete search history.

(56) References Cited

U.S. PATENT DOCUMENTS

| | | |
|---|---|---|
| 9,716,504 B2 | 7/2017 | Fujita |
| 2015/0207512 A1 | 7/2015 | Fujita |
| 2021/0143459 A1* | 5/2021 | Ikeda ................ H01M 8/04179 |

FOREIGN PATENT DOCUMENTS

| | | |
|---|---|---|
| JP | 6060976 B2 | 1/2017 |
| KR | 10-1020200 B1 | 3/2011 |
| KR | 10-1656993 B1 | 9/2016 |
| KR | 10-2021-0129756 A | 10/2021 |

\* cited by examiner

*Primary Examiner* — Olatunji A Godo
(74) *Attorney, Agent, or Firm* — Fish & Richardson P.C.

(57) ABSTRACT

A fuel cell generation system control apparatus performs a method for controlling power of a fuel cell generation system. A monitoring device monitors power of the one or more fuel cell modules. A controller compensates for power of one or more first fuel cell modules by one or more second fuel cell modules, based on the monitored power, and performs power control of the one or more fuel cell modules. The fuel cell generation system control apparatus addresses a problem in which power of the fuel cell generation system is reduced as there is a change in external environment or an increase in driving time upon power control of a multi-module fuel cell system.

17 Claims, 9 Drawing Sheets

FUEL CELL GENERATION SYSTEM CONTROL APPARATUS, SYSTEM INCLUDING THE SAME AND METHOD THEREOF

CROSS-REFERENCE TO RELATED APPLICATION

This application claims the benefit of priority to Korean Patent Application No. 10-2022-0036902, filed in the Korean Intellectual Property Office, on Mar. 24, 2022, the entire contents of which are incorporated herein by reference.

TECHNICAL FIELD

The present disclosure relates to a fuel cell generation system control apparatus, a system including the same, and a method thereof, and more particularly, relates to a fuel cell generation system control apparatus for maintaining constant power of a fuel cell generation system, a system including the same, and a method thereof.

BACKGROUND

A fuel cell generation system may include a fuel cell stack in which a plurality of fuel cells used as a power source are laminated, a fuel supply system for supplying hydrogen or the like which is a fuel to the fuel cell stack, an air supply system for supplying oxygen which is an oxidizing agent for electrochemical reaction, a water and heat management system for controlling a temperature of the fuel cell stack, and the like. The fuel cell generation system may include a plurality of fuel cell modules. The sum of power produced by the plurality of fuel cell modules may be total power of the fuel cell generation system.

Particularly, the fuel cell generation system needs to maintain constant power to meet the required power demand even in changes in external environment (season, weather, or the like). Furthermore, as the total power of the existing fuel cell generation system is reduced because power of a separate fuel cell module is reduced over time, it is not easy to maintain constant power. Thus, there is a need to develop a technology for addressing such a problem.

SUMMARY

The present disclosure has been made to solve the above-mentioned problems occurring in the prior art while advantages achieved by the prior art are maintained intact.

An aspect of the present disclosure provides a fuel cell generation system control apparatus for maintaining constant power of a fuel cell generation system, a system including the same, and a method thereof.

Another aspect of the present disclosure provides a fuel cell generation system control apparatus for addressing a problem in which power of a fuel cell generation system is reduced depending on a change in external environment, a system including the same, and a method thereof.

Another aspect of the present disclosure provides a fuel cell generation system control apparatus for addressing a problem in which power of a fuel cell generation system is reduced over time, a system including the same, and a method thereof.

Another aspect of the present disclosure provides a fuel cell generation system control apparatus capable of using a wasted fuel cell module for vehicle as a compensation module, a system including the same, and a method thereof.

Another aspect of the present disclosure provides a fuel cell generation system control apparatus for finally stabilizing power of a fuel cell generation system to generate required power, a system including the same, and a method thereof.

According to an aspect of the present disclosure, a fuel cell generation system control apparatus can include a monitoring device connected with one or more fuel cell modules including one or more first fuel cell modules and one or more second fuel cell modules to monitor power of the one or more fuel cell modules and a controller that compensates for power of the one or more first fuel cell modules by the one or more second fuel cell modules, based on the monitored power, and performs constant power control of the one or more fuel cell modules.

In some implementations, the controller can calculate the ratio of insufficient power to target power, based on the power of the one or more fuel cell modules and can control driving of the one or more second fuel cell modules, based on the ratio of the insufficient power to the target power.

In some implementations, the controller can sequentially control starting of the one or more second fuel cell modules whenever the ratio of the insufficient power to the target power is greater than predetermined one or more first reference values.

In some implementations, the controller can calculate insufficient power compared to target power, based on the power of the one or more fuel cell modules, can determine power of the one or more second fuel cell modules, based on the insufficient power compared to the target power, and can control driving of the one or more second fuel cell modules, based on the determined power of the one or more second fuel cell modules.

In some implementations, the controller can determine a fuel cell module with minimum power among fuel cell stacks being driven, when the ratio of the insufficient power to the target power is greater than a predetermined second reference value, and can replace the determined fuel cell module with the minimum power.

In some implementations, the controller can generate power by adding the insufficient power to the target power and power of the fuel cell module with the minimum power, by the one or more second fuel cell modules, to stop the fuel cell module with the minimum power, when the determined fuel cell module with the minimum power is the first fuel cell module.

In some implementations, the controller can additionally generate power of the fuel cell module with the minimum power, by the one or more first fuel cell modules, to stop the fuel cell module with the minimum power, when the determined fuel cell module with the minimum power is the second fuel cell module.

According to another aspect of the present disclosure, a fuel cell generation system can include one or more fuel cell modules including one or more first fuel cell modules and one or more second fuel cell modules and a fuel cell generation system control apparatus connected with the one or more fuel cell modules to monitor power of the one or more fuel cell modules and compensate for power of the one or more first fuel cell modules by the one or more second fuel cell modules, based on the monitored power, and perform constant power control of the one or more fuel cell modules.

In some implementations, the fuel cell generation system control apparatus can calculate the ratio of insufficient power to target power, based on the power of the one or more fuel cell modules and can control driving of the one or more second fuel cell modules, based on the ratio of the insufficient power to the target power.

In some implementations, the fuel cell generation system control apparatus can sequentially control starting of the one or more second fuel cell modules whenever the ratio of the insufficient power to the target power is greater than predetermined one or more first reference values.

In some implementations, the fuel cell generation system control apparatus can calculate insufficient power compared to target power, based on the power of the one or more fuel cell modules, can determine power of the one or more second fuel cell modules, based on the insufficient power compared to the target power, and can control driving of the one or more second fuel cell modules, based on the determined power of the one or more second fuel cell modules.

In some implementations, the fuel cell generation system control apparatus can determine a fuel cell module with minimum power among fuel cell stacks being driven, when the ratio of the insufficient power to the target power is greater than a predetermined second reference value, and can replace the determined fuel cell module with the minimum power.

In some implementations, the fuel cell generation system control apparatus can generate power by adding the insufficient power to the target power and power of the fuel cell module with the minimum power, by the one or more second fuel cell modules, to stop the fuel cell module with the minimum power, when the determined fuel cell module with the minimum power is the first fuel cell module.

In some implementations, the fuel cell generation system control apparatus can additionally generate power of the fuel cell module with the minimum power, by the one or more first fuel cell modules, to stop the fuel cell module with the minimum power, when the determined fuel cell module with the minimum power is the second fuel cell module.

According to another aspect of the present disclosure, a fuel cell generation system control method can include monitoring, by a monitoring device connected with one or more fuel cell modules including one or more first fuel cell modules and one or more second fuel cell modules, power of the one or more fuel cell modules and compensating, by a controller, for power of the one or more first fuel cell modules by the one or more second fuel cell modules, based on the monitored power, and performing, by the controller, constant power control of the one or more fuel cell modules.

In some implementations, the performing of the constant power control of the one or more fuel cell modules by the controller can include calculating, by the controller, the ratio of insufficient power to target power, based on the power of the one or more fuel cell modules, and controlling, by the controller, driving of the one or more second fuel cell modules, based on the ratio of the insufficient power to the target power.

In some implementations, the controlling of the driving of the one or more second fuel cell modules, based on the ratio of the insufficient power to the target power by the controller can include sequentially controlling, by the controller, starting of the one or more second fuel cell modules whenever the ratio of the insufficient power to the target power is greater than predetermined one or more first reference values.

In some implementations, the performing of the constant power control of the one or more fuel cell modules by the controller can include calculating, by the controller, insufficient power compared to target power, based on the power of the one or more fuel cell modules, determining, by the controller, power of the one or more second fuel cell modules, based on the insufficient power compared to the target power, and controlling, by the controller, driving of the one or more second fuel cell modules, based on the determined power of the one or more second fuel cell modules.

In some implementations, the fuel cell generation system control method can further include determining, by the controller, a fuel cell module with minimum power among fuel cell stacks being driven, when the ratio of the insufficient power to the target power is greater than a predetermined second reference value, and replacing, by the controller, the determined fuel cell module with the minimum power.

In some implementations, the replacing of the determined fuel cell module with the minimum power by the controller can include generating, by the controller, power by adding the insufficient power to the target power and power of the fuel cell module with the minimum power, by the one or more second fuel cell modules, to stop the fuel cell module with the minimum power, when the determined fuel cell module with the minimum power is the first fuel cell module, and additionally generating, by the controller, power of the fuel cell module with the minimum power, by the one or more first fuel cell modules, to stop the fuel cell module with the minimum power, when the determined fuel cell module with the minimum power is the second fuel cell module.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
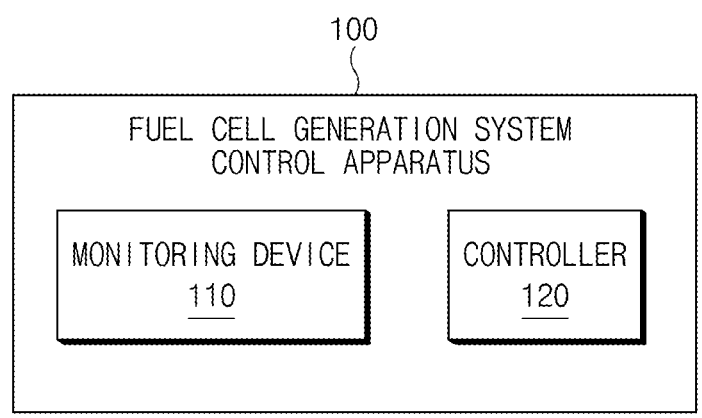
FIG. 1 is a block diagram illustrating an example of a fuel cell generation system control apparatus.

Hereinafter, some implementations of the present disclosure will be described in detail with reference to the exemplary drawings. In the drawings, the same reference numerals will be used throughout to designate the same or equivalent elements. In addition, a detailed description of well-known features or functions will be ruled out in order not to obscure the gist of the present disclosure.

Hereinafter, implementations of the present disclosure will be described in detail with reference to FIGS. 1 to 8.

FIG. 1 is a block diagram illustrating an example of a fuel cell generation system control apparatus.

In some implementations, a fuel cell generation system control apparatus 100 can be implemented inside or outside a multi-module fuel cell system. In this case, the fuel cell generation system control apparatus 100 can be integrally configured with control units in the multi-module fuel cell system or can be implemented as a separate hardware device to be connected with the control units of the multi-module fuel cell system by a separate connection means.

In some implementations, the fuel cell generation system control apparatus 100 can be integrally configured with the multi-module fuel cell system or can be implemented as a configuration independent of the multi-module fuel cell system in the form of being installed/attached to the multi-module fuel cell system. Alternatively, a part of the fuel cell generation system control apparatus 100 can be integrally configured with the multi-module fuel cell system or the other can be implemented as a configuration independent of the multi-module fuel cell system in the form of being installed/attached to the multi-module fuel cell system.

In some implementations, the multi-module fuel cell system can be provided in a vehicle to supply power to a motor, a system, a load, and/or other auxiliary machinery of the vehicle.

The multi-module fuel cell system can refer to a fuel cell system which includes a plurality of fuel cell modules (e.g., power module complete (PMC)) connected in parallel to generate high power.

Referring to FIG. 1, the fuel cell generation system control apparatus 100 can include a monitoring device 110 and a controller 120.

The monitoring device 110 and the controller 120 can include a processor which performs data processing and/or calculation associated with an operation described below. Furthermore, the monitoring device 110 and the controller 120 can include a memory which stores data or an algorithm required in a process of performing data processing and/or calculation.

The processor which can be included in the monitoring device 110 and the controller 120 can be an electric circuit which executes a command of software. For example, the processor included in the monitoring device 110 and the controller 120 can be a fuel-cell control unit (FCU), an electronic control unit (ECU), a micro controller unit (MCU), or another sub-controller.

The memory which can be included in the monitoring device 110 and the controller 120 can include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The monitoring device 110 can be connected with one or more fuel cell modules including one or more first fuel cell modules and one or more second fuel cell modules to monitor power of the one or more fuel cell modules.

Herein, the first fuel cell module can refer to a normal fuel cell module driven in a normal constant current driving process, and the second fuel cell module can refer to a compensation fuel cell module driven in a compensation driving process.

In some implementations, the monitoring device 110 can simultaneously monitor total power generated by the one or more fuel cell modules and separate power generated by a separate fuel cell module in real time while the one or more fuel cell modules are driven.

In some implementations, the monitoring device 110 can be connected with fuel-cell DC-DC converters (FDCs) respectively provided in the one or more fuel cell modules to monitor power of each of the one or more fuel cell modules and total power of the one or more fuel cell modules by the FDCs.

In some implementations, the monitoring device 110 can be connected with the controller 120 through wireless or wired communication to deliver information about power of the one or more fuel cell modules to the controller 120 in real time.

The controller 120 can compensate for power of the one or more first fuel cell modules by the one or more second fuel cell modules, based on the monitored power, and can perform constant power control of the one or more fuel cell modules.

In some implementations, the controller 120 can calculate insufficient power by subtracting the monitored total power of the fuel cell system from target power, based on the monitored power, can generate the insufficient power by the one or more second fuel cell modules, and can constantly control total power of the one or more fuel cell modules.

In this process, the controller 120 can receive information about power (i.e., target power) required for the fuel cell generation system from an upper controller.

In some implementations, the controller 120 can calculate insufficient power compared to target power, based on the power of the one or more fuel cell modules, can determine power of the one or more second fuel cell modules, based on the insufficient power compared to the target power, and control driving of the one or more second fuel cell modules, based on the determined power of the one or more second fuel cell modules.

In detail, the controller 120 can determine a value, obtained by dividing the insufficient power compared to the target power by the number of the one or more second fuel cell modules which are driven, as power of the one or more second fuel cell modules.

In some implementations, the controller 120 can control power of each fuel cell module by the FDC provided in each of the one or more fuel cell modules.

In some implementations, the controller 120 can calculate the ratio of the insufficient power to the target output, based on the power of the one or more fuel cell modules, can control starting or driving of the one or more second fuel cell module, based on the ratio of the insufficient power to the target power.

In some implementations, whenever the ratio of the insufficient power to the target power is greater than predetermined one or more first reference values, the controller 120 can sequentially control starting of one or more second fuel cell modules.

In some implementations, the one or more first reference values can be preset by the number of the one or more second fuel cell modules.

Because the higher the ratio of the insufficient power to the target power, the more the compensation power is needed, the controller 120 can control starting of a large number of second fuel cell modules as the radio of the insufficient power to the target power increases.

In this process, the controller 120 can control starting of the one or more second fuel cell modules in stages depending on the one or more first reference values.

In some implementations, when the ratio of the insufficient power to the target power is greater than a predetermined second reference value, the controller 120 can determine a fuel cell module with the minimum power among fuel cell modules being driven and can replace the determined fuel cell module with the minimum power.

The second reference value can be determined as a value of a maximum value or more among the one or more first reference values. Thus, when the ratio of the insufficient power to the target power is greater than the second reference value, as it is greater than all the one or more first reference values, all the one or more second fuel cell modules can be driven.

In some implementations, the controller 120 can determine the fuel cell module with the minimum power among the fuel cell stacks being driven, based on the power of the separate fuel cell module, which is monitored by the monitoring device 110.

In some implementations, the controller 120 can replace the determined fuel cell module with the minimum power with a new fuel cell module.

Herein, the new fuel cell module can refer to an extra fuel cell module which is not normally driven.

In some implementations, in the process of replacing the fuel cell module with the minimum power with the new fuel cell module, when the fuel cell module with the minimum power is the first fuel cell module, the controller 120 can additionally generate power, reduced as the first fuel cell module with the minimum power is stopped, by another fuel cell module.

In some implementations, the controller 120 can additionally generate power, reduced as the first fuel cell module with the minimum power is stopped, by the one or more second fuel cell modules which are driven.

In other words, when the fuel cell module with the minimum power is the first fuel cell module, the controller 120 can generate power by adding the insufficient power compared to the target power and power of the fuel cell module with the minimum power, by the one or more second fuel cell modules, and can stop the first fuel cell module with the minimum power.

At this time, the controller 120 can control separate power of the second fuel cell module which is driven to be a value obtained by dividing the power, obtained by adding the insufficient power compared to the target power and the power of the fuel cell module with the minimum power, by the number of second fuel cell modules which are driven.

In some implementations, in the process of replacing the fuel cell module with the minimum power with the new fuel cell module, when the fuel cell module with the minimum power is the second fuel cell module, the controller 120 can additionally generate power, reduced as the second fuel cell module with the minimum power is stopped, by another fuel cell module.

In some implementations, the controller 120 can additionally generate power, reduced as the second fuel cell module with the minimum power is stopped, by the one or more first fuel cell modules which are driven.

In other words, when the fuel cell module with the minimum power is the second fuel cell module, the controller 120 can additionally generate power of the fuel cell module with the minimum power, by the one or more first fuel cell modules, and can stop the second fuel cell module with the minimum power.

Figure 2:
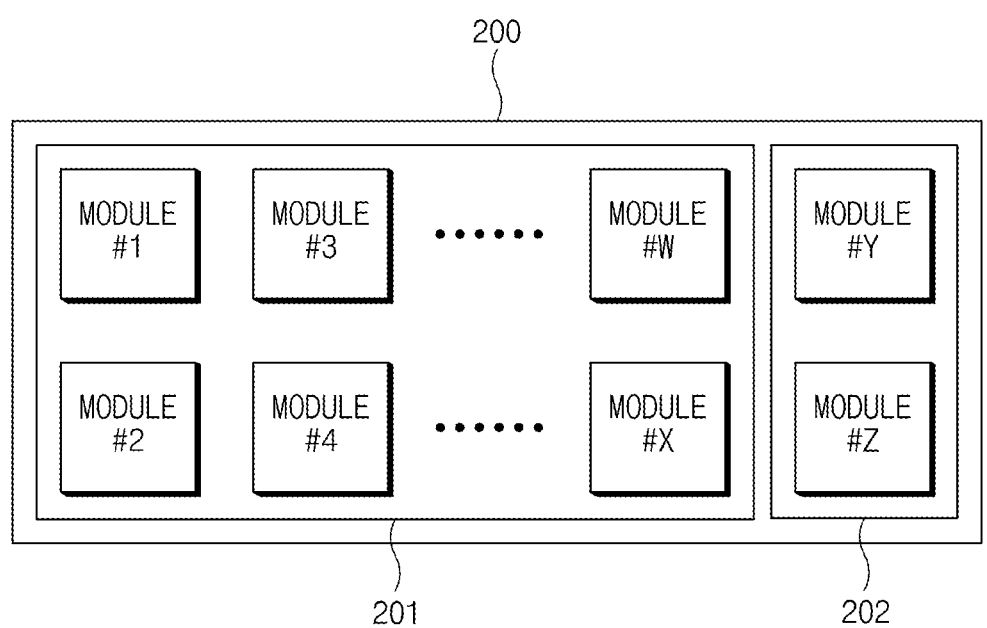
FIG. 2 is a block diagram illustrating an example of a multi-module fuel cell system.

FIG. 2 is a block diagram illustrating an example of a multi-module fuel cell system.

Referring to FIG. 2, one or more fuel cell modules 200 can include one or more first fuel cell modules 201 and one or more second fuel cell modules 202.

In some implementations, the one or more fuel cell modules 200 can include the N first fuel cell modules 201 and the two second fuel cell modules 202.

The first fuel cell modules 201 can refer to normal fuel cell modules which are driven in a normal constant power driving process.

The second fuel cell modules 202 can refer to compensation fuel cell modules which are driven in a compensation driving process.

In the normal constant power driving process, the first fuel cell modules 210 can generate all of required total power.

In some implementations, in the normal constant power driving process, each of the first fuel cell modules 201 can generate power of a value obtained by dividing the required total power by the number (N) of the first fuel cell modules 201.

As power of the one or more first fuel cell modules 201 is reduced over time or according to an external environment, when insufficient power compared to the required total power is greater than a reference value, the insufficient power can be compensated by the second fuel cell modules 202.

In this case, the second fuel cell modules 202 can generate the insufficient power.

In some implementations, in the compensation control process, each of the second fuel cell modules 202 can generate power of a value obtained by dividing the insufficient power by the number of the second fuel cell modules 202 which are driven.

Figure 3:
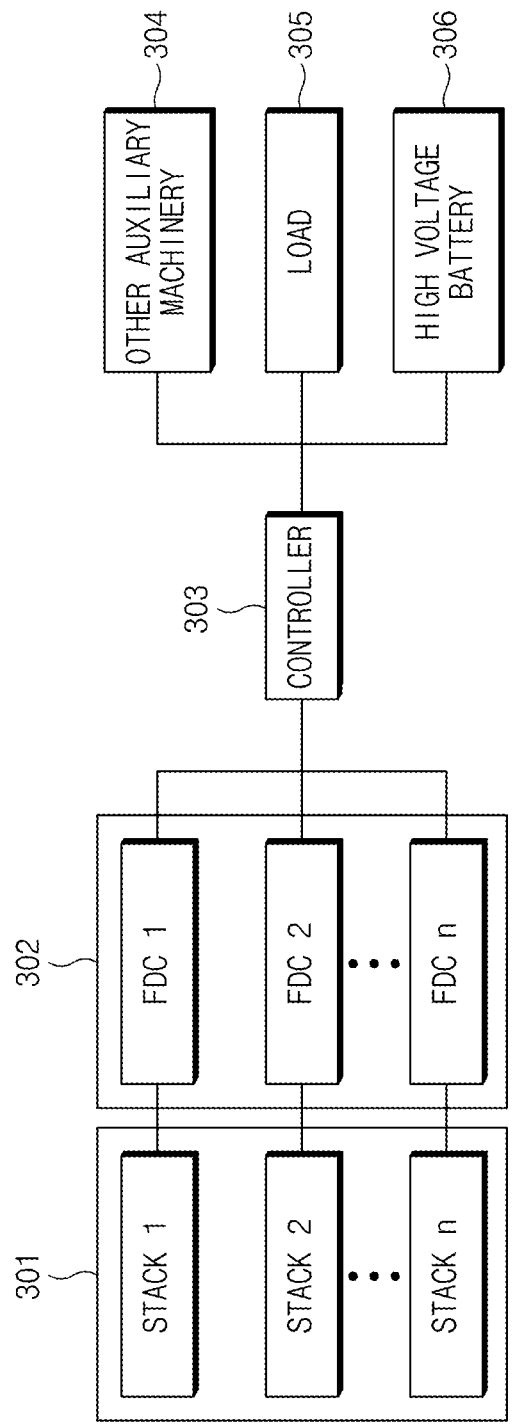
FIG. 3 is a block diagram illustrating an example of a detailed configuration of a fuel cell generation system.

FIG. 3 is a block diagram illustrating an example of a detailed configuration of a fuel cell generation system.

Referring to FIG. 3, a multi-module fuel cell system can include one or more fuel cell stacks 301, one or more FDCs 302, and a controller 303.

Furthermore, In some implementations, the multi-module fuel cell system can be connected with other auxiliary machinery 304, a load 305, and a high voltage battery 306.

The one or more fuel cell stacks 301 can generate power to be supplied to the other auxiliary machinery 304 and the load 305.

The fuel cell stacks 301 can be connected with the FDCs 302, respectively.

Each of the FDCs 302 can boost or buck a voltage of power generated by each of the fuel cell stacks 301.

Each of the FDCs 302 can deliver the boosted power to the load 305 or the other auxiliary machinery 304 or can charge the high voltage battery 306 using the boosted power.

Furthermore, each of the FDCs 302 can control a current and voltage of each of the fuel cell stacks 301 to control the amount of production of power of the separate fuel cell stack 301.

The controller 303 can be one controller connected with the one or more FDCs 302, which can include one or more processors which perform data processing and a command.

The controller 303 can include an FCU.

The controller 303 can monitor separate power and total power of the one or more fuel cell stacks 301 by the one or more FDCs 302, Furthermore, the controller 303 can control power of the one or more fuel cell stacks 301 depending on the monitored separate power and total power of the one or more fuel cell stack 301.

The controller 303 can control the total amount of production of power produced by the one or more fuel cell stacks 301 and can control distribution of power produced by the one or more fuel cell stacks 301.

Power required for the multi-module fuel cell system can include power required for the load 305 and the other auxiliary machinery 304.

The other auxiliary machinery 304 can include a fuel cell system and an air compressor, a humidifier, a cathode oxygen depletion (COD) heater, a coolant pump, or the like of the vehicle.

Power can be supplied to the load 305 and the other auxiliary machinery 304 by power generated by the fuel cell stacks 301 and the high voltage battery 306.

Thus, power generated by the fuel cell stacks 301 and the high voltage battery 306 can be greater than or equal to power required in the load 305 and the other auxiliary machinery 304. To this end, the controller 303 can control production and distribution of power.

Figure 4:
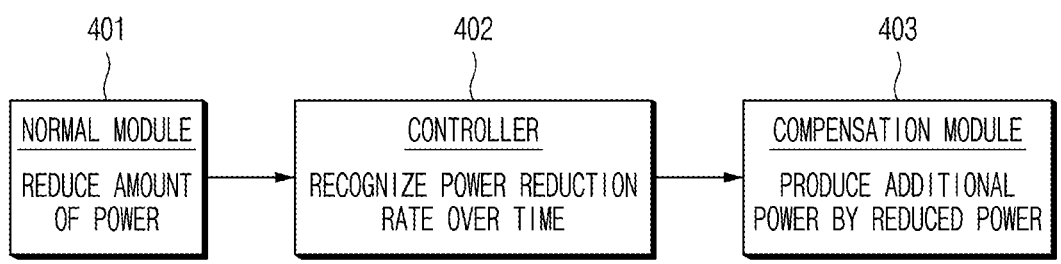
FIG. 4 is a drawing illustrating an example of an operation of a fuel cell generation system.

FIG. 4 is a drawing illustrating an example of an operation of a fuel cell generation system.

The amount of power of a normal module 401 can be reduced over time or according to an external environment.

In some implementations, as a driving time increases due to degradation in stack or the like, power of a separate fuel cell module can be reduced.

As another example, power of a separate fuel cell module can be reduced according a temperature, weather, a season, or the like.

A controller 402 can recognize a power reduction rate for the normal module 401 over time.

Herein, the power reduction rate can refer to the ratio of insufficient power to power required according to power reduction.

In some implementations, the controller 402 can monitor total power of a fuel cell module in real time and can calculate the ratio of insufficient power to required power, based on the monitored power.

The controller 402 can determine the number of compensation modules 403 to be driven based on the ratio of the insufficient power to the required power.

The controller 402 can control power of the compensation module 403 such that total power generated by the normal module 401 and the compensation module 403 is the required power.

Figure 5A:
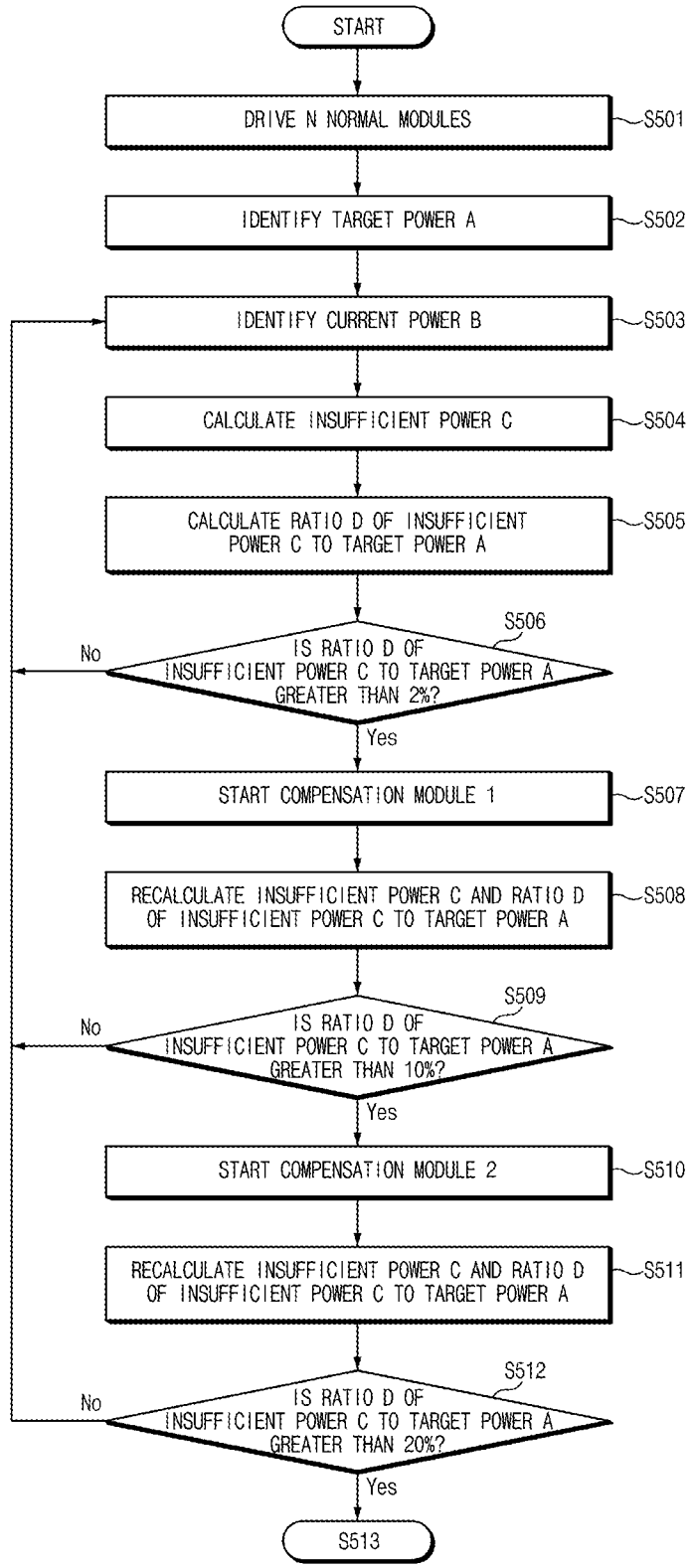
FIGS. 5A and 5B are flowcharts illustrating examples of operation of a fuel cell generation system control apparatus.
Figure 5B:
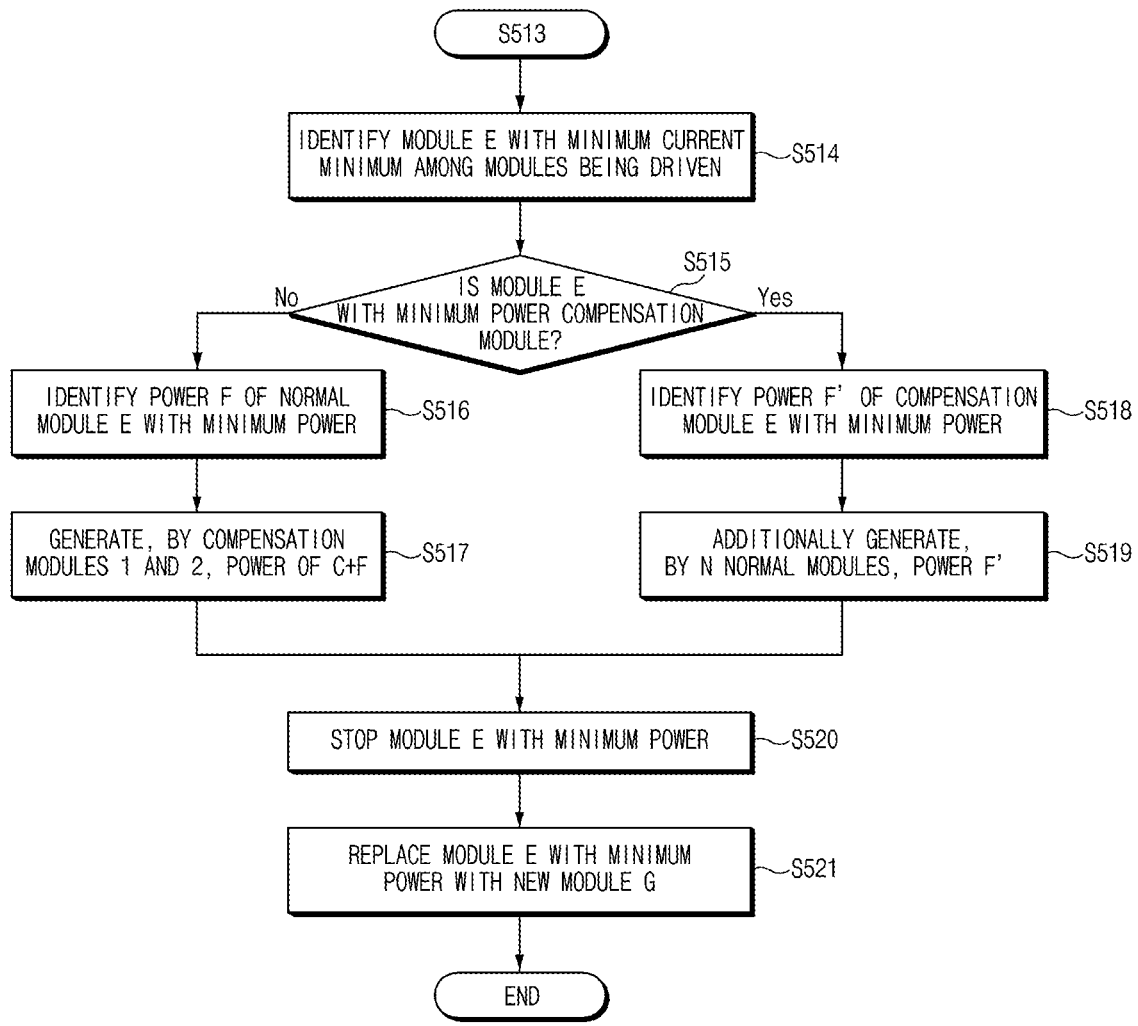

FIGS. 5A and 5B are flowcharts illustrating examples of operation of a fuel cell generation system control apparatus.

Referring to FIG. 5A, in S501, the fuel cell generation system control apparatus can drive N normal modules.

In S502, the fuel cell generation system control apparatus can identify target power A.

In some implementations, the fuel cell generation system control apparatus can receive information about the target power A from an upper controller.

In some implementations, the fuel cell generation system control apparatus can generate the target power A by the N normal modules.

In S503, the fuel cell generation system control apparatus can identify current power B.

In some implementations, the fuel cell generation system control apparatus can identify current total power B of a fuel cell generation system by FDCs included in the N normal modules.

In S504, the fuel cell generation system control apparatus can calculate insufficient power C.

In some implementations, the fuel cell generation system control apparatus can calculate the insufficient power C by subtracting the current power B from the target power A.

In S505, the fuel cell generation system control apparatus can calculate the ratio D of the insufficient power C to the target power A.

In some implementations, the fuel cell generation system control apparatus can calculate the ratio D of the insufficient power to the target power A, using the formula of 100−C/A*100=D (%).

In S506, the fuel cell generation system control apparatus can identify whether the ratio D of the insufficient power C to the target power A is greater than 2%.

Herein, the reference value of 2% can be a value for giving an example and can be actually determined as another value.

When the ratio D of the insufficient power C to the target power A is not greater than 2%, the fuel cell generation system control apparatus can return to S503 to identify the current power B.

When the ratio D of the insufficient power C to the target power A is greater than 2%, in S507, the fuel cell generation system control apparatus can start compensation module 1.

In some implementations, the fuel cell generation system control apparatus can generate the target power A by the N normal modules and the started compensation module 1.

In S508, the fuel cell generation system control apparatus can recalculate the insufficient power C and the ratio D of the insufficient power C to the target power A.

In S509, the fuel cell generation system control apparatus can identify whether the ratio D of the insufficient power C to the target power A is greater than 10%.

Herein, the reference value of 10% can be a value for giving an example and can be determined as another value greater than the reference value which is a criterion in S506.

When the ratio D of the insufficient power C to the target power A is not greater than 10%, the fuel cell generation system control apparatus can return to S503 to identify the current power B.

When the ratio D of the insufficient power C to the target power A is greater than 10%, the fuel cell generation system control apparatus can start compensation module 2.

In some implementations, the fuel cell generation system control apparatus can generate the target power A by the N normal modules and the started compensation modules 1 and 2.

In S511, the fuel cell generation system control apparatus can recalculate the insufficient power C and the ratio D of the insufficient power C to the target power A.

In S512, the fuel cell generation system control apparatus can identify whether the ratio D of the insufficient power C to the target power A is greater than 20%.

Herein, the reference value of 20% can be a value for giving an example and can be determined as another value greater than the reference value which is a criterion in S509.

When the ratio D of the insufficient power C to the target power A is not greater than 20%, the fuel cell generation system control apparatus can return to S503 to identify the current power B.

When the ratio D of the insufficient power C to the target power A is greater than 20%, the fuel cell generation system control apparatus can perform S513.

A description will be given of an operation after S513 with reference to FIG. 5B.

Referring to FIG. 5B, the fuel cell generation system control apparatus can identify a module E with the minimum current power among fuel cell modules which are being driven.

In some implementations, the fuel cell generation system control apparatus can identify the module E with the minimum current power among the fuel cell modules which are being driven, by FDCs included in the N normal modules and the compensation modules 1 and 2.

In S515, the fuel cell generation system control apparatus can identify whether the module E with the minimum current power is a compensation module.

When the module E with the minimum current power is not the compensation module, in S516, the fuel cell generation system control apparatus can identify power F of the normal module E with the minimum power.

In S517, the fuel cell generation system control apparatus can control power of the compensation module such that compensation modules 1 and 2 generate power of C+F.

When the module E with the minimum current power is the compensation module, in S517, the fuel cell generation system control apparatus can identify power F' of the compensation module E with the minimum power.

In S519, the fuel cell generation system control apparatus can control power of the N normal modules such that the N normal modules additionally generate power F'.

In S520, the fuel cell generation system control apparatus can stop the module E with the minimum power.

In S521, the fuel cell generation system control apparatus can replace the module E with the minimum power with a new module G.

Figure 6:
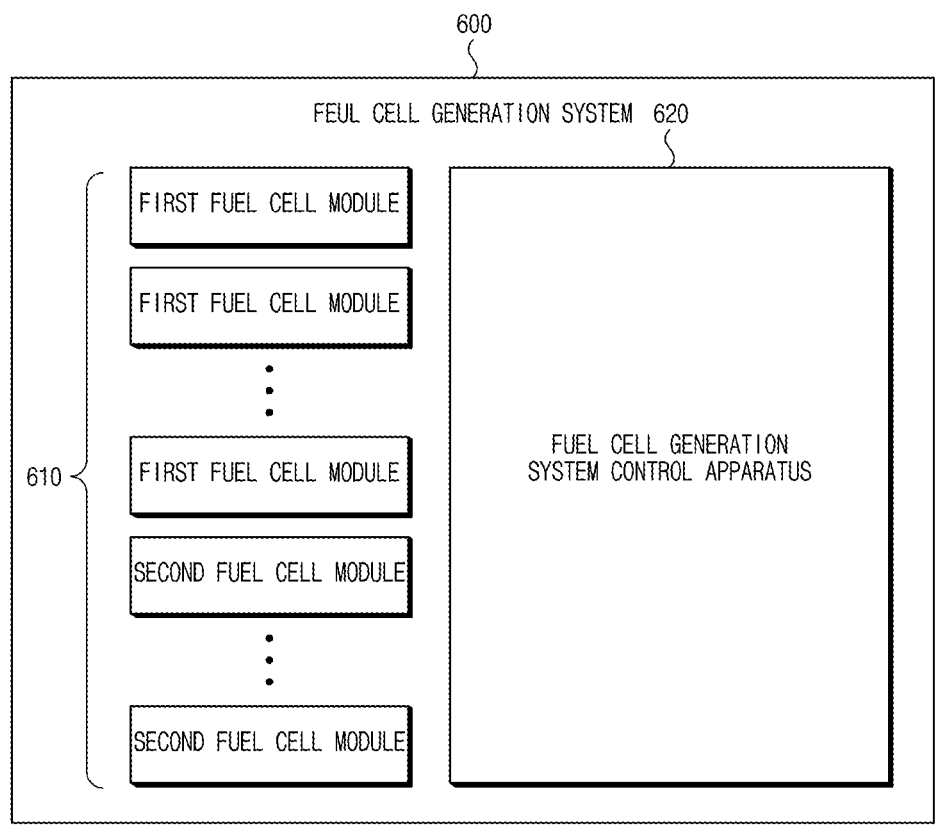
FIG. 6 is a block diagram illustrating an example of a fuel cell generation system.

FIG. 6 is a block diagram illustrating an example of a fuel cell generation system.

Referring to FIG. 6, a fuel cell generation system 600 can include one or more fuel cell modules 610 and a fuel cell generation system control apparatus 620.

The one or more fuel cell modules 610 can include one or more first fuel cell modules and one or more second fuel cell modules.

In some implementations, the one or more first fuel cell modules and the one or more second fuel cell modules can be connected with each other in parallel to generate power by a fuel cell stack included in each module.

In a normal driving situation, which may not need compensation control, only the one or more first fuel cell modules can be driven and the one or more second fuel cell modules can fail to be driven.

The fuel cell generation system control apparatus 620 can be connected with the one or more fuel cell modules 610 to monitor power of the one or more fuel cell modules 610, compensate for power of the one or more first fuel cell modules by the one or more second fuel cell modules, based on the monitored power, and perform constant power control of the one or more fuel cell modules 610.

In some implementations, the fuel cell generation system control apparatus 620 can calculate the ratio of insufficient power to target power, based on the power of the one or more fuel cell modules 610, and can control driving of the one or more second fuel cell modules, based on the ratio of the insufficient power to the target power.

In some implementations, the fuel cell generation system control apparatus 620 can sequentially control starting of the one or more second fuel cell modules whenever the ratio of the insufficient power to the target power is greater than predetermined one or more first reference values.

In some implementations, the fuel cell generation system control apparatus 620 can calculate insufficient power compared to target power, based on the power of the one or more fuel cell modules 610, can determine power of the one or more second fuel cell modules, based on the insufficient power compared to the target power, and can control driving of the one or more second fuel cell modules, based on the determined power of the one or more second fuel cell modules.

In some implementations, when the ratio of the insufficient power to the target power is greater than a predetermined second reference value, the fuel cell generation system control apparatus 620 can determine a fuel cell module with minimum power among fuel cell stacks being driven and can replace the determined fuel cell module with the minimum power with a new fuel cell module.

In some implementations, when the determined fuel cell module with the minimum power is the first fuel cell module, the fuel cell generation system control apparatus 620 can generate power by adding the insufficient power compared to the target power and the power of the fuel cell module with the minimum power, by the one or more second fuel cell modules, and can stop the fuel cell module with the minimum power.

In some implementations, when the determined fuel cell module with the minimum power is the second fuel cell module, the fuel cell generation system control apparatus 620 can additionally generate power of the fuel cell module with the minimum power, by the one or more first fuel cell modules, and can stop the fuel cell module with the minimum power.

Figure 7:
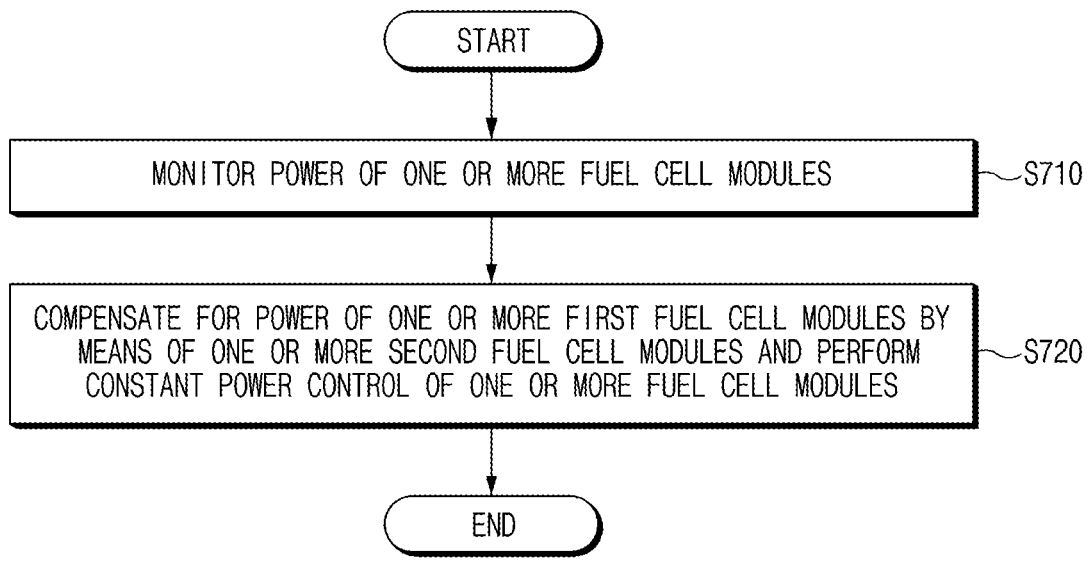
FIG. 7 is a flowchart illustrating an example of a fuel cell generation system control method.

FIG. 7 is a flowchart illustrating an example of a fuel cell generation system control method.

Referring to FIG. 7, the fuel cell generation system control method can include monitoring (S710) power of one or more fuel cell modules and compensating (S720) for power of one or more first fuel cell modules by one or more second fuel cell modules and performing (S720) constant power control of the one or more fuel cell modules.

The monitoring (S710) of the power of the one or more fuel cell modules can be performed by a monitoring device connected with the one or more fuel cell modules including the one or more first fuel cell modules and the one or more second fuel cell modules.

The compensating (S720) for the power of the one or more first fuel cell modules by the one or more second fuel cell modules and the performing (S720) of the constant power control of the one or more fuel cell modules can be performed by a controller.

In some implementations, the controlling (S720) of the constant power control of the one or more fuel cell modules can include calculating, by the controller, the ratio of insufficient power to target power, based on the power of the one or more fuel cell modules, and controlling, by the controller, driving of the one or more second fuel cell modules, based on the ratio of the insufficient power to the target power.

In some implementations, the controlling of the driving of the one or more second fuel cell modules by the controller can include sequentially controlling, by the controller, the one or more second fuel cell modules whenever the ratio of the insufficient power to the target power is greater than predetermined one or more first reference values.

In some implementations, the performing (S720) of the constant power control of the one or more fuel cell modules can include calculating, by the controller, insufficient power compared to target power, based on the power of the one or more fuel cell modules, determining, by the controller, power of the one or more second fuel cell modules, based on the insufficient power compared to the target power, and controlling, by the controller, driving of the one or more second fuel cell modules, based on the determined power of the one or more second fuel cell module.

In some implementations, the fuel cell generation system control method can further include determining, by the controller, a fuel cell module with minimum power among fuel cell stacks being driven, when the ratio of the insufficient power to the target power is greater than a predetermined second reference value, and replacing, by the controller, the determined fuel cell module with the minimum power.

In some implementations, the replacing of the determined fuel cell module with the minimum power by the controller can include generating, by the controller, power by adding the insufficient power to the target power and power of the fuel cell module with the minimum power, by the one or more second fuel cell modules, to stop the fuel cell module with the minimum power, when the determined fuel cell module with the minimum power is the first fuel cell module, and additionally generating, by the controller, power of the fuel cell module with the minimum power, by the one or more first fuel cell modules, to stop the fuel cell module with the minimum power, when the determined fuel cell module with the minimum power is the second fuel cell module.

Figure 8:
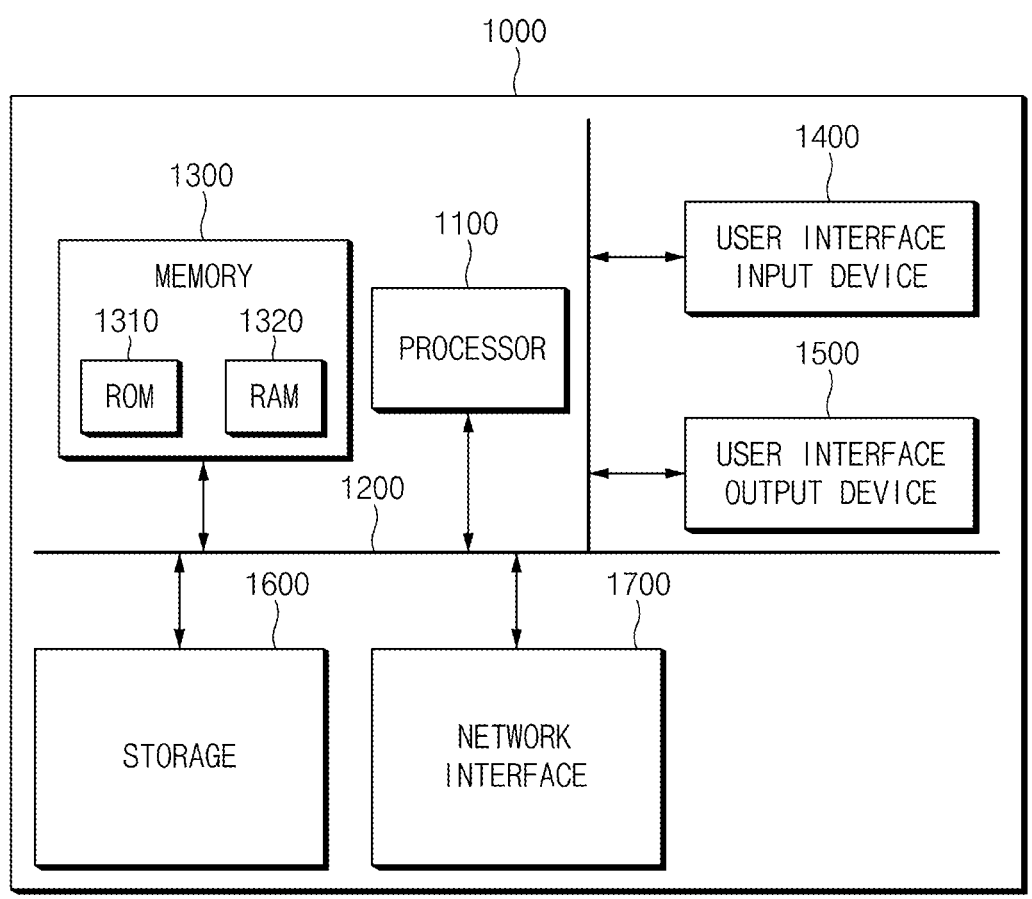
FIG. 8 is a block diagram illustrating an example of a computing system.

FIG. 8 is a block diagram illustrating an example of a computing system.

Referring to FIG. 8, a computing system 1000 can include at least one processor 1100, a memory 1300, a user interface input device 1400, a user interface output device 1500, a storage 1600, and a network interface 1700, which are connected with each other via a bus 1200.

The processor 1100 can be a central processing unit (CPU) or a semiconductor device that processes instructions stored in the memory 1300 and/or the storage 1600. The memory 1300 and the storage 1600 can include various types of volatile or non-volatile storage media. For example, the memory 1300 can include a ROM (Read Only Memory) 1310 and a RAM (Random Access Memory) 1320.

Thus, the operations of the method or the algorithm described in connection with the implementations disclosed herein can be implemented directly in hardware or a software module executed by the processor 1100, or in a combination thereof. The software module can reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium can be coupled to the processor 1100. The processor 1100 can read out information from the storage medium and can write information in the storage medium. Alternatively, the storage medium can be integrated with the processor 1100. The processor and the storage medium can reside in an application specific integrated circuit (ASIC). The ASIC can reside within a user terminal. In another case, the processor and the storage medium can reside in the user terminal as separate components.

A description will be given of effects of the fuel cell generation system control apparatus, the system including the same, and the method thereof according to implementations of the present disclosure.

According to at least one of implementations of the present disclosure, the fuel cell generation system control apparatus, the system including the same, and the method thereof can be provided to maintain constant power of a fuel cell generation system.

Furthermore, according to at least one of implementations of the present disclosure, the fuel cell generation system control apparatus, the system including the same, and the method thereof can be provided to address a problem in which power of a fuel cell generation system is reduced depending on a change in external environment.

Furthermore, according to at least one of implementations of the present disclosure, the fuel cell generation system control apparatus, the system including the same, and the method thereof can be provided to address a problem in which power of a fuel cell generation system is reduced over time.

Furthermore, according to at least one of implementations of the present disclosure, the fuel cell generation system control apparatus, the system including the same, and the method thereof can be provided to use a wasted fuel cell module for vehicle as a compensation module.

Furthermore, according to at least one of implementations of the present disclosure, the fuel cell generation system control apparatus, the system including the same, and the method thereof can be provided to finally stabilize power of a fuel cell generation system to generate required power.

In addition, various effects ascertained directly or indirectly through the present disclosure can be provided.

Hereinabove, although the present disclosure has been described with reference to exemplary implementations and the accompanying drawings, the present disclosure is not limited thereto, but can be variously modified and altered by those skilled in the art to which the present disclosure pertains without departing from the spirit and scope of the present disclosure claimed in the following claims.

Therefore, implementations of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A fuel cell generation system control apparatus, comprising:
   a monitoring device connected to one or more fuel cell modules and configured to monitor power of the one or more fuel cell modules, the one or more fuel cell modules including (i) one or more first fuel cell modules and (ii) one or more second fuel cell modules; and
   a controller configured to:
      based on the monitoring device monitoring the power of the one or more fuel cell modules, compensate for power of the one or more first fuel cell modules by the one or more second fuel cell modules,
      perform a power control of the one or more fuel cell modules,
      based on the monitoring device monitoring the power of the one or more first fuel cell modules, determine a ratio of an insufficient power of the one or more first fuel cell modules relative to a target power, and
      drive the one or more second fuel cell modules based on a determination that the ratio of the insufficient power of the one or more first fuel cell modules relative to the target power is greater than a predetermined threshold value.

2. The fuel cell generation system control apparatus of claim 1, wherein the controller is further configured to control driving of the one or more second fuel cell modules based on the ratio of the insufficient power to the target power.

3. The fuel cell generation system control apparatus of claim 2, wherein the controller is further configured to:

control starting of the one or more second fuel cell modules based on the ratio of the insufficient power relative to the target power being greater than one or more first reference values that are predetermined.

4. The fuel cell generation system control apparatus of claim 2, wherein the controller is further configured to:
based on the ratio of the insufficient power relative to the target power being greater than a predetermined reference value, determine a fuel cell module having a minimum power among the one or more fuel cell modules that are driven; and
replace the determined fuel cell module with another fuel cell module among the one or more fuel cell modules.

5. The fuel cell generation system control apparatus of claim 4, wherein the controller is further configured to:
based on the determined fuel cell module being a first fuel cell module among the one or more first fuel cell modules, generate power corresponding to a sum of the insufficient power relative to the target power and the minimum power of the determined fuel cell module by the one or more second fuel cell modules; and
stop the first fuel cell module.

6. The fuel cell generation system control apparatus of claim 4, wherein the controller is further configured to:
based on the determined fuel cell module being a second fuel cell module among the one or more second fuel cell modules, additionally generate power corresponding to the minimum power of the determined fuel cell module by the one or more first fuel cell modules; and
stop the second fuel cell module.

7. A fuel cell generation system, comprising:
one or more fuel cell modules including (i) one or more first fuel cell modules and (ii) one or more second fuel cell modules; and
a fuel cell generation system control apparatus connected to the one or more fuel cell modules and configured to:
monitor power of the one or more fuel cell modules,
based on the monitored power of the one or more fuel cell modules, compensate for power of the one or more first fuel cell modules by the one or more second fuel cell modules,
perform power control of the one or more fuel cell modules,
based on monitoring the power of the one or more first fuel cell modules, determine a ratio of an insufficient power of the one or more first fuel cell modules relative to a target power, and
drive the one or more second fuel cell modules based on a determination that the ratio of the insufficient power of the one or more first fuel cell modules relative to the target power is greater than predetermined threshold value.

8. The fuel cell generation system of claim 7, wherein the fuel cell generation system control apparatus is further configured to
control driving of the one or more second fuel cell modules based on the ratio of the insufficient power to the target power.

9. The fuel cell generation system of claim 8, wherein the fuel cell generation system control apparatus is further configured to:
control starting of the one or more second fuel cell modules based on the ratio of the insufficient power relative to the target power being greater than one or more first reference values that are predetermined.

10. The fuel cell generation system of claim 8, wherein the fuel cell generation system control apparatus is further configured to:
based on the ratio of the insufficient power relative to the target power being greater than a predetermined reference value, determine a fuel cell module having a minimum power among the one or more fuel cell modules that are driven; and
replace the determined fuel cell module with another fuel cell among the one or more fuel cell modules.

11. The fuel cell generation system of claim 10, wherein the fuel cell generation system control apparatus is further configured to:
based on the determined fuel cell module being a first fuel cell module among the one or more first fuel cell modules, generate power corresponding to a sum of the insufficient power relative to the target power and the minimum power of the determined fuel cell module by the one or more second fuel cell modules; and
stop the first fuel cell module.

12. The fuel cell generation system of claim 10, wherein the fuel cell generation system control apparatus is further configured to:
based on the determined fuel cell module being a second fuel cell module among the one or more second fuel cell modules, additionally generate power corresponding to the minimum power of the determined fuel cell module by the one or more first fuel cell modules; and
stop the second fuel cell module.

13. A method for controlling a fuel cell generation system, the method comprising:
monitoring power of one or more fuel cell modules by a monitoring device connected to the one or more fuel cell modules, the one or more fuel cell modules including (i) one or more first fuel cell modules and (ii) one or more second fuel cell modules;
based on monitoring the power of the one or more fuel cell modules, compensating, by a controller, for power of the one or more first fuel cell modules by the one or more second fuel cell modules; and
performing, by the controller, power control of the one or more fuel cell modules,
wherein performing the power control comprises:
based on the monitoring device monitoring the power of the one or more first fuel cell modules, determining, by the controller, a ratio of an insufficient power of the one or more first fuel cell modules relative to a target power, and
driving, by the controller, the one or more second fuel cell modules based on a determination that the ratio of the insufficient power of the one or more first fuel cell modules relative to the target power is greater than a predetermined threshold value.

14. The method of claim 13, wherein driving the one or more second fuel cell modules comprises:
controlling, by the controller, driving of the one or more second fuel cell modules based on the ratio of the insufficient power to the target power.

15. The method of claim 14, wherein controlling the driving of the one or more second fuel cell modules comprises:
controlling, by the controller, starting of the one or more second fuel cell modules based on the ratio of the insufficient power relative to the target power being greater than one or more first reference values that are predetermined.

16. The method of claim 14, further comprising:
- based on the ratio of the insufficient power relative to the target power being greater than a predetermined reference value, determining, by the controller, a fuel cell module having a minimum power among the one or more fuel cell modules that are driven; and
- replacing, by the controller, the determined fuel cell module with another fuel cell among the one or more fuel cell modules.

17. The method of claim 16, wherein replacing the determined fuel cell module comprises:
- based on the determined fuel cell module being a first fuel cell module among the one or more first fuel cell modules, generating, by the controller, power corresponding to a sum of the insufficient power relative to the target power and the minimum power of the determined fuel cell module by the one or more second fuel cell modules;
- stopping the first fuel cell module;
- based on the determined fuel cell module being a second fuel cell module among the one or more second fuel cell modules, additionally generating, by the controller, power corresponding to the minimum power of the determined fuel cell module by the one or more first fuel cell modules; and
- stopping the second fuel cell module.

* * * * *